Patented Nov. 9, 1943

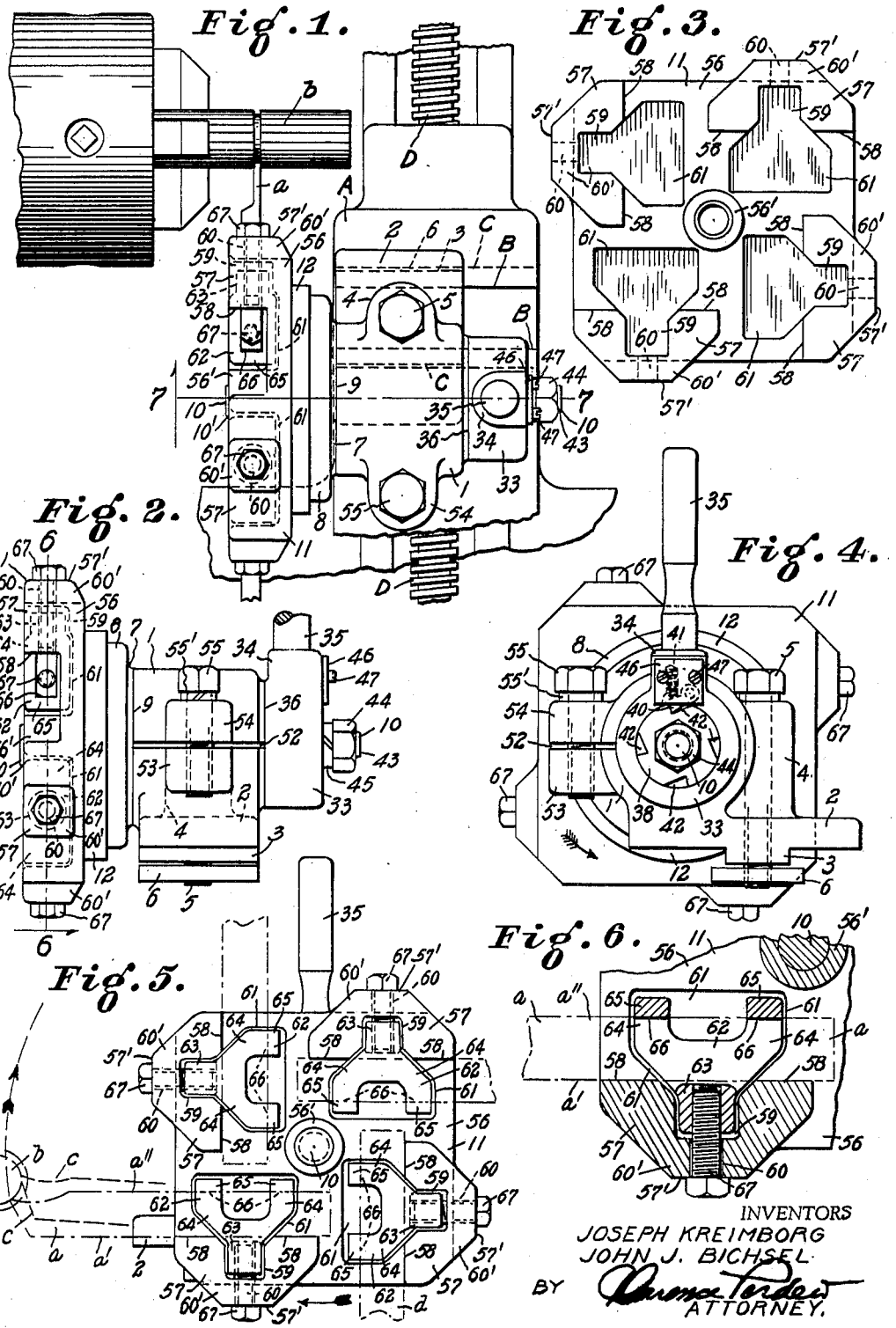

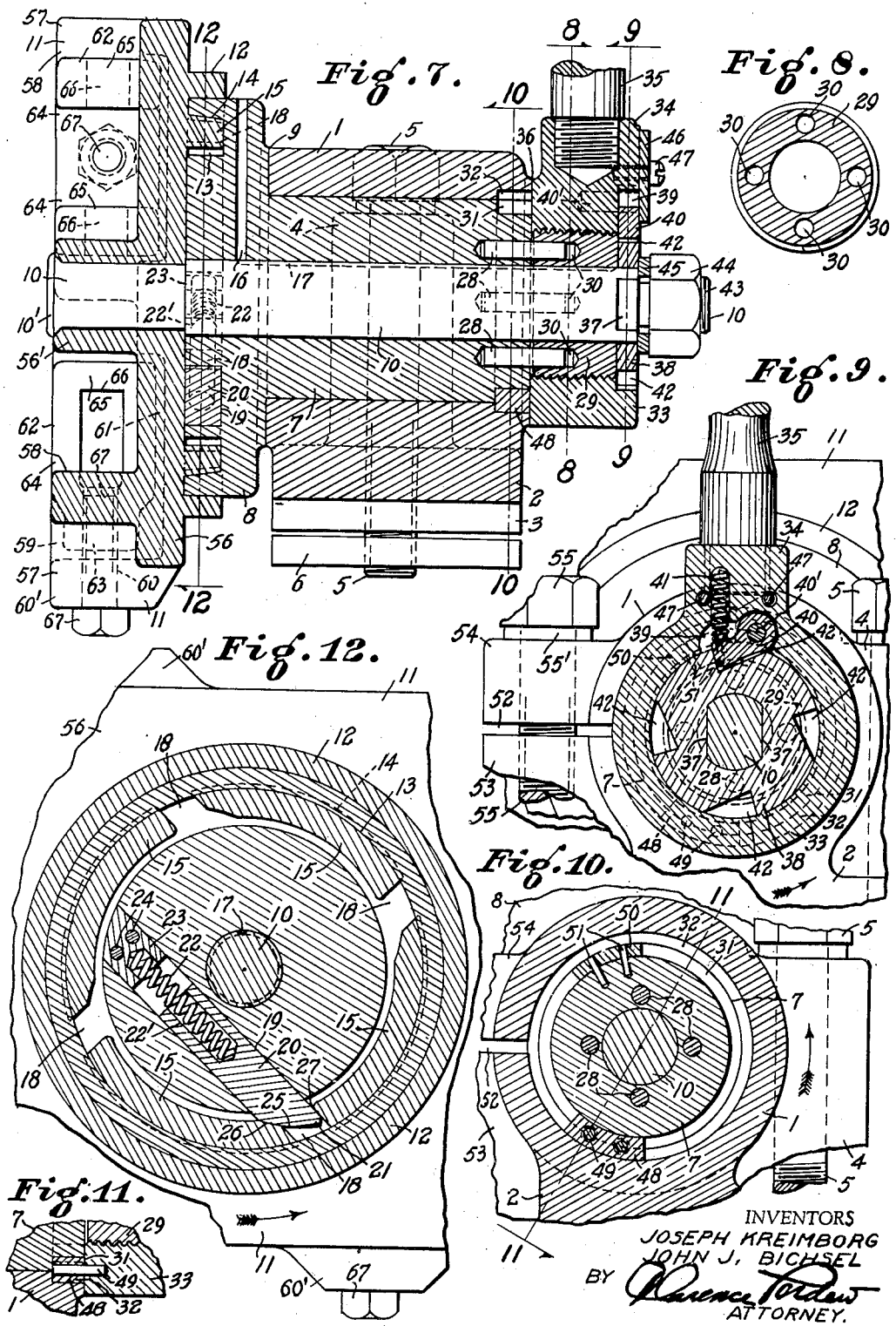

2,333,939

UNITED STATES PATENT OFFICE 2,333,939

TURRET DEVICE

Joseph Kreimborg, Ludlow, Ky., and John J. Bichsel, Cincinnati, Ohio, assignors to Jefferson Machine Tool Company Division of The Reh Company, Cincinnati, Ohio, a corporation of Ohio Application February 28, 1942, Serial No. 432,850

5 Claims. (Cl. 29—48)

Our invention relates to machine tools, and more especially to attachments for machine tools characterized in that the attachment holds a plurality of tools successively or selectively brought into operative relation to the work piece carried by the machine tool. In a usual turret lathe is an example of a device operating to this effect, but built as part of the lathe, and it usually serves to bring tools to position for application along a line axially of a work piece rotated by the lathe. Our present invention relates more particularly to turret means to bring tools to position for application along a line radial or tangential of such piece.

An object of our invention, therefore, is to make available for use as a turret machine tool, a machine tool not initially provided with means for such use, by means so attachable to a working part of the machine tool as to permit the feeding and positioning of the attachment by the usual means normally operative on the machine tool. This object our invention has in common with certain prior devices, and the peculiar object is to improve in the mounting of tools on the attachment or turret, and in the setting of the turret to apply the tools at various postures as may be required, and in the fixation of the tools in any of the postures, rigidly, for accurate and smooth cutting. Other more detailed objects will appear in the course of the following description of a preferred example of our invention, illustrated by the accompanying drawings, in which—

Figure 1 is a plan view of a device embodying our invention and of parts of a lathe to indicate the mode of application of the device to the lathe, the turret head carrying tools, to indicate the mode of application of the tools to the work carried by the lathe chuck;

Fig. 2 is a front elevation of said device, detached from the lathe and without tools;

Fig. 3 is a head-end elevation of the turret head without the tool-holding stirrups;

Fig. 4 is a tail-end elevation of the device, corresponding to the front elevation of Fig. 2;

Fig. 5 is a head-end elevation of the same, portions of three tools carried by the turret head, and a complete fourth tool carried thereby, being shown by dot-and-dash lines, and an application of this fourth tool to the work being indicated, while dash lines indicate a second-postured application of the same tool to the work;

Fig. 6 is an enlarged partial vertical front-to-rear section of the turret head, on the plane of the line 6—6 of Fig. 2, more clearly illustrating the clamping of a tool in the turret head;

Fig. 7 is a further enlarged vertical longitudinal section of the device, on the plane of the line 7—7 of Fig. 1;

Fig. 8 is a vertical cross section of the clamping collar, on the plane of the line 8—8 of Fig. 7;

Fig. 9 is a vertical cross section of the device on the plane of the line 9—9 of Fig. 7, portions being broken away for lack of space;

Fig. 10 is a like section on the plane of the line 10—10 of Fig. 7;

Fig. 11 is a fragmentary section on the plane of the line 11—11 of Fig. 10, to illustrate more clearly the attachment of the stop to the rocker than is to be understood from Figs. 9 and 10; and Fig. 12 is a vertical cross section on the plane of the line 12—12 of Fig. 7, portions being broken away for lack of space.

In the preferred construction in which our invention is embodied, a barrel 1, hollow tubular on a horizontal axis, has integral with its bottom a base 2 extending backward with its bottom surface finished plane to fit on the plane top of the cross slide A of a lathe, and with a depending tongue 3 accurately guided between the upper side walls B of the crosswise T-slot of cross slide A, as seen in Fig. 1. A boss 4 extends up from base 2 along the rear side of barrel 1, being integral with the base and barrel, and a clamp bolt 5 extends down through the vertical bore of the boss and through tongue 3, below which it is threaded into clamp plate 6 which lies in the lower part of the cross-slide T slot, between walls C thereof, to be drawn up against the overhanging surfaces of the T slot, rigidly clamping the base and barrel 1 to the lathe cross slide, in a well known manner, in place of the usual tool post of the lathe.

Snugly journaled in the barrel 1 is the posturing rotor 7, also hollow tubular, and this rotor has integral with it at the head end of barrel 1 the relatively thick disk 8 which has an endthrust bearing 9 against the adjacent end of barrel 1. The spindle 10 is snugly journaled in rotor 7, extending at the head end with slightly reduced diameter leaving a shoulder at the headface side of disk 8; and this reduced extended end part of the spindle has fixed on it the turret head 11 between the upset end of the spindle and the shoulder. The spindle 10 and head 11 may be welded together at the upset end of the spindle, as at 10', or these parts may otherwise be connected to make them rigidly unitary.

The head 11 has an annular flange 12 on its tail-face side, closely surrounding the periphery of disk 8; and shortly radially inward from its periphery, disk 8 has the annular groove 13 concentric with shaft 10. The outer wall 14 of this groove is slanted to be slightly conical, flaring toward head 11; and this head has four segmental flanges 15 projecting into groove 13 with their outer sides slanted to conform with the conical shape of the groove outer wall 14, to wedge into this groove upon movement axially in tail-end direction, of turret head 11 relatively to rotor 7 and its disk 8. The disk has a radial lubricant port 16, and the spindle 10 has a longitudinal lubricant groove 17 with which port 16 may register.

The segmental flanges 15, uniformly spaced, leave detent notches 18 between each two adjacent segment ends; and these ends are so shaped that these notches 18 are offset from but have their side walls parallel with a diametral line through the axis of the assembly. The circular portion of disk 8 bounded by groove 13 has in it a dog-guiding groove 19 of like offset relation to the axis, that is, being chordal to the disk inner portion. The locking dog 20 slides snugly in this groove 19 and is pressed to extend one end 21 toward the segments 15 and into notches 18, by a compression spring 22 extending from a bore 22' in the other end of the dog 20 into a bore in a filler block 23 held in groove 19 by pins 24, as best seen in Fig. 12. The notches 18 are narrower than the dog-guiding groove 19, and the entering end part of the dog 20 is tapered at 25 to fit wedgingly against a champfer 26 at the radially inner end of one side of each notch 18; the other side of the notch alining with the corresponding side of the dog-guiding groove 19 and receiving the straight side 27 of the end part of the dog 20. As indicated by the arrows, the turret head 11 with its segments 15, may be rotated over-forward, under-backward relatively to disk 8, but is locked against opposite turning due to the relation of the dog and notches.

The spindle 10 projects from the posturing rotor 7 at the tail end of the device, and at equal intervals around spindle 10 are pins 28 fixed in the end part of the rotor 7 and projecting parallel with the spindle. Snugly rotatable on spindle 10 is the collar 29 which has holes 30 receiving the respective pins 28, and which is exteriorly threaded throughout its axial length. The adjacent end of rotor 7 has a reduced diameter, forming a part 31 of a groove, the other part of which is formed by an enlarged diameter 32 of the end part of the bore or barrel 1, as best seen in Figs. 7 and 10. The rocker 33 is collar-shaped, with an exterior radially extending boss 34 internally threaded, into which is screwed the reduced threaded end part of the handle 35 to extend radially from rocker 33. Internally, this rocker 33 is threaded snugly to receive the exteriorly threaded collar 29; and the head-face side of the rocker forms a thrust bearing 36 against the adjacent end of posturing rotor 7, and less snugly, against the adjacent end of barrel 1.

Past collar 29, spindle 10 has opposite flats 37, and the ratchet wheel 38 has its central opening snugly fitting the flatted spindle portion, so that the spindle will turn with the wheel 38. In a recess 39, which is an extension of the circular recess in the tail-face side of rocker 33 in which ratchet wheel 38 is received, a pawl 40 is pivoted on a pin 40' driven into an opening in rocker 33; and a compression spring 41 in an upward branch of the recess presses the pawl 40 to the periphery of wheel 38 or into any one of its notches 42, all of which is best seen in Fig. 9. As the arrow indicates, swinging handle 35 forward and downward, that is, away from the lathe spindle axis as best understood from Fig. 5, causes pawl 40 to lock against a tooth end of a notch 42, turning the spindle 10, and the turret head unitary therewith, in the same direction. Swinging the handle 35 in the opposite direction brings pawl 40 to a next notch 42.

Past its flatted part, where it receives ratchet wheel 38, the spindle 10 has the reduced threaded end part 43 receiving a nut 44 binding a lock washer 45 against ratchet wheel 38 to make the wheel 38 and the spindle 10 in effect rigidly unitary, both as to turning and as to axial distance between the rocker 33 and the turret head 11. For the directions of rotation just described, the threads of rocker 33 and collar 29 are right-hand. Thus, when the handle 35 is swung toward the lathe spindle axis, that is opposite to the direction indicated by the arrow, Figs. 4, 5, 10 and 12, and most clearly in Fig. 9, the collar 29 being held not to rotate relative to posturing rotor 7 by the pins 28, and the rocker being prevented by the clamped ratchet wheel 38 from moving in tail-end direction, the collar 29 must slide in head-end direction to clamp against the end of rotor 7 and, with further swinging of handle 35, to draw the spindle 10 and turret head 11 axially in tail-end direction. This movement results in drawing the turret-head segmental flanges 15 to wedge their slanted outer sides to the conical wall 14 of disk 8, which is a unitary part of the rotor 7.

A small cover plate 46 is held to the rocker 33 by two screws 47, holding the pawl 40 and its spring 41 in place. On the inner side of rocker 33, fitting in the groove made up of the two parts 31 and 32 in the ends of rotor 7 and barrel 1 as before explained, is the segmental stop 48, held to the rocker 33 by two pins 49. On the reduced cylindrical end part of rotor 7 which forms the groove part 31, is the segmental stop 50, held to rotor 7 by two pins 51. Rocker stop 48 is radially wide enough to occupy both groove parts 31 and 32; but rotor stop 50 occupies only rotor groove part 31, so that rotor 7, in assembling the device, may be passed through the bore of barrel 1 with the stop 50 pinned onto the rotor 7, as could not be done after the rotor 7 has been passed into the barrel without stop 50 on it.

Rotor 7 has been called a posturing rotor for the reason that it is adapted to be rotated in barrel 1 to angularly shift all of the turret-head setting and locking and clamping elements carried by rotor 7 as above described. This rotation of rotor 7 in the direction of the arrow in Fig. 5 will so reset the parts, for instance, that instead of the dog 20 stopping turret head 11 with a tool *a* horizontal and cutting work piece *b* below the horizontal plane of the work-piece axis, it will stop the head 11 with a tool slanted upward toward the work-piece axis and cutting the piece *b* at some higher location, as slightly above the horizontal axial plane, as the tool *c* in Fig. 5. These different settings of the tools in a tool post of course are according to the skill of the machinist, prompted by the shape of the tool cutting edge or point, the material of the work piece *b*, and other considerations well known in the art. This rotation and shifting enables our device to permit such settings of the tools, each taking its new setting as brought under and up to the work, as easily as one tool is reset with its usual mounting on a lathe, either by a rocker in the tool post or by rise and fall of the lathe cross slide.

For clamping rotor 7 in barrel 1 or releasing it for turning, to make the shifting of tool settings just described, barrel 1 is slitted at 52 on its front side where it has the lower ear 53 and the upper ear 54 integral with it, made separate by the slitting. A clamp screw 55 through upper ear 54 is threaded into lower ear 53, with its head pressing a lock washer 55' to the top of upper ear 54, drawing the upper portion of barrel 1 down to clamp rotor 7 between it and the lower portion of the barrel after the rotor has been turned for the tool setting just described. The vertical position of handle 35 shown throughout the views of the drawings is that at the beginning of a forward downward swing of the handle to rotate the turret head 11, with the rotor 7 clamped in the barrel 1, for setting the next tool, as the tool d partly shown at the bottom of Fig. 5, up to the work; and it is the position to which handle 35 is returned immediately after this setting. This return swing, as before explained, is the movement which sets clamp collar 29 rigidly to clamp the turret head 11 to clamped rotor 7, for the accurate working of the tool. It will be understood that the entire device is drawn forward by working the cross-slide screw D, Fig. 1, as usual on a lathe, while tool shifting is effected. Also, that if rotor 7 is shifted in barrel 1 for setting from a to c in Fig. 5, this same cross-slide operation sets the device accordingly.

The sensing of the lathe operator may be relied upon for him to swing handle 35 just as far backward as is required to clamp by collar 29, as the pawl 40 enters and slightly passes a notch 42 ready to enter the notch at the next down swing. But in swinging the handle 35 forward and downward, a dog 20, entering a notch 18 between turret head segments, may easily be made to ride out of the notch 18 by continued downward swinging of handle 35, leaving the turret head unlocked with the tool in wrong position or posture, in which it might be locked by collar 29 on return up-swing of handle 35. It is highly desirable, therefore, that the down-swing of handle 35 be stopped fairly accurately at that point which it has reached just when dog 20 has entered a notch 18; that is, not beyond the reach of the dog 20, wedging to notch champfer 26, to bring, by the pressure of spring 22 on the dog, the turret head to its exact position for locking by the dog and correct presentation of the tool, to maintain this condition until the up-swing of handle 35 and action of collar 29 clamps the parts in such condition, in the manner before fully explained.

Certain prior apparatus having many of the characteristics of our device in the respects to here described, has had a stop for the rocker 33 and handle 35 fixed on the part corresponding to the barrel 1 and base 2 of our device. A stop so fixed can insure correct setting only at one setting of the posturing rotor 7 in the barrel 1. Rotation of this rotor 7 and clamping it in a new position, raising a tool as in Fig. 5, or lowering it, in either case departing from the relation for which the prior fixed stop was located, will result in carrying a turret head notch 18 past dog 20, or else not quite to the dog; in either case having the wrong results that can be had by using no stop, as just before explained. We overcome these objections by having the stops 48 and 50, fixed, respectively, on rocker 33 and rotor 7, as before described and as best seen in Fig. 10. The relative positioning of these stops as shown allows slightly more than 90 degrees swing of handle 35; sufficient to insure a turret-head notch 18 being carried fully into respective relation to dog 20, yet preventing the notch being carried past the dog. These stops always will have this relative position, because stop 50 is on rotor 7 and is set properly in just the degree that adjustment of rotor 7 in barrel 1, for reposturing the tools as before explained, is adjusted.

As the action of clamp collar 29 depends upon the degree of swinging of rocker 33 and handle 35, being screwed farther toward rotor 7 on a long return swing, or not so far on a short return swing, as can occur with the prior art fixed stop, the clamping effect of this collar can be exerted against ratchet wheel 38 on an excessive down swing, making it hard to start return of the handle 35 and rocker 33 and tending to loosen nut 34 on the spindle. With our improved combination of stops, this clamping effect always is the same, to whatever degree rotor 7 is turned on barrel 1. The nicety with which this collar 29 should operate is indicated by the use of the four pins 28, which permit the collar 29 to be assembled with rotor 7 in any one of four different angular positions; being intervals of one-fourth the thread pitch. Also, one or the other setting on the pins 28 insures that only about one-fourth turn of rocker 33, or one-fourth the thread pitch, effects the movement of collar 29 axially to from clamping relation to rotor 7.

The turret head 11 comprises, integrally formed, a plate 56 having a hub 56' for spindle 10, and having the four yokes 57, one for each of the four settings before described; the plate 56 for this number of yokes being approximately square, with a yoke next to each of its corners. Each yoke has a pair of inner faces 58 alined at right angles to one of the adjacent plate edges and separated by a gap 59. The yoke narrows outwardly to an outer face 57' from which there is a bore 60 into the gap 59 at right angles to the faces 58. The outer narrower portion of the yoke projects at 60' past the other plate edge adjacent to the corner; and the plate 56 has, at each yoke, a recess 61 continuous with and widening inward from the gap 59, to receive a respective stirrup 62. Each stirrup 62 comprises a neck 63 and opposite pairs of arms 64 diverging from the neck 63 inwardly, with each pair of arms having its inner ends joined integrally by a crossing part 65 having its face 66 between arms parallel with the yoke inner faces 58; these faces 66 and faces 58 being machined as abutments to receive the straight edges of a tool bar, as the edges a' and a'' of the bar a in Figs. 5 and 6. A clamp screw 67 passes through the yoke bore 60 and threads into the stirrup neck 63, so that, turned with its head against outer yoke face 57', screw 67 draws stirrup faces 66 toward yoke faces 58 to clamp the tool bar.

The tool bar thus is very positively held against yielding in the plane of rotation, and is maintained in any position to which it is moved or swung in the stirrup 62 by the operator in setting up the machine, by the tightness of clamping, as in any usual tool post setting. The turret head 11 thus carries the four tool bars or holders at four equally spaced tangents to a circle of rotation of the head as it is set by handle 35, or as the posture is shifted by setting the rotor 7 in the barrel 1, as before described. Tool bars of ample rectangular cross section, like those usually used in a lathe tool post, are held with all of the rigidity that they would be in such tool post, with the rapidity of applying the several held tools had by specially built turret lathes. Yet the turret head 11 is not excessively bulky or heavy; and the entire device is readily applied to a usual lathe with the result of converting the lathe into an effective turret lathe for rapid successive operations on the lathe work radial or tangential to a circle of rotation of the work. It will be understood that an embodiment of our invention may provide for a greater or less number of tools, with the setting mechanism altered accordingly, and with corresponding shapes and spacings of yokes in the turret head formation. Also, that any such embodiment may function on any machine, whether called a lathe or not, in which tools are similarly applied to the work carried by the machine; as for instance, but without limitation, certain boring or milling machines, so called, used in such a manner. Also it will be understood that various other modifications may occur in use of the principles of our improvements, and that while we have described a preferred embodiment rather specifically, we are not to be limited to such precise disclosure, but

What we claim as new and desire to secure by Letters Patent is:

1. In a turret device, a rotor, a barrel in which said rotor is rotatable, means whereby said barrel may be made to clamp said rotor stationary, a spindle rotatable in said rotor, a turret head fixed on said spindle, a plurality of means on said turret head to hold thereon respective tools to be positioned selectively for operation on a work piece carried by a machine on which the turret device is mounted, locking elements on said rotor and on said turret head, respectively, coactive to lock each tool in its operating position, manipulating means having a range of swinging and active on said spindle when swung in one direction, to position each tool, and when swung in return direction being inactive on said spindle and then assuming an active relation to the spindle for positioning a next tool, said rotor, when it is turned in said barrel, relocating the range of tool-selective rotation of said spindle, for shifting the operating posture in which each tool is brought to operating position by said spindle, and coacting stops, one on said rotor and one on and swung with said manipulating means, so relatively located as to stop the tool-positioning swing of the manipulating means with the turret-head and rotor locking elements in relation for locking action, the rotation of the one stop, with the rotor, maintaining the relative location of the two stops when the rotor is turned and set in the barrel.

2. A turret device as set forth in claim 1, in which there is included a member slidable on the spindle axially thereof but constrained against rotation by the rotor, and in which the swinging manipulating means has an operative engagement with said member to slide the member into and out of clamping engagement with the adjacent part of the rotor, said manipulating means and said spindle comprising elements coactive, upon said clamping engagement, to cause said spindle to draw said turret head into clamped contact with said rotor, and in which device, the maintenance of relative location of the stops, upon change of setting of the rotor as therein set forth, maintains the degree of axial movement of said member on the spindle incident to the tool-setting and return swings of the manipulating means.

3. A turret device as set forth in claim 1, in which the rotor is recessed within the barrel, and the therein mentioned one stop is located in the recessed portion of the rotor, the stop on the manipulating means projecting into and traveling in said recessed portion to and from said one stop as the manipulating means is swung.

4. A turret device as set forth in claim 1, in which the barrel is recessed interiorly next to the rotor and the manipulating means, and the therein mentioned one stop is located on the rotor within the recessed portion of the barrel, the stop on the manipulating means projecting into and traveling in said recessed portion to and from said one stop as the manipulating means is swung.

5. A turret device as set forth in claim 1, in which the rotor is recessed within the barrel and the barrel is recessed interiorly coincident with the recessing of the rotor, next to the manipulating means, and the therein mentioned one stop on the rotor being within the recessed portion of the rotor, the stop on the manipulating means projecting into and traveling in the recessed portions of the barrel and rotor to and from said one stop as the manipulating means is swung.

JOSEPH KREIMBORG.
JOHN J. BICHSEL.